United States Patent
Yin et al.

(10) Patent No.: US 9,016,461 B2
(45) Date of Patent: Apr. 28, 2015

(54) WORKPIECE-SEPARATING DEVICE

(71) Applicants: Shenzhen Futaihong Precision Industry Co., Ltd., Shenzhen (CN); FIH (Hong Kong) Limited, Kowloon (HK)

(72) Inventors: Mao-Yi Yin, Shenzhen (CN); Jian-Ping Jin, Shenzhen (CN); Bing Yu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/955,263

(22) Filed: Jul. 31, 2013

(65) Prior Publication Data

US 2014/0251759 A1   Sep. 11, 2014

(30) Foreign Application Priority Data

Mar. 11, 2013   (CN) .......................... 2013 1 00760679

(51) Int. Cl.
*B65G 47/26* (2006.01)
*B65G 47/90* (2006.01)
*B65G 47/91* (2006.01)

(52) U.S. Cl.
CPC .............. *B65G 47/26* (2013.01); *B65G 47/907* (2013.01); *B65G 47/918* (2013.01)

(58) Field of Classification Search
CPC ........ B65G 47/26; B65G 47/28; B65G 33/02; B65G 33/04
USPC .......... 198/459.1, 459.3, 459.4, 468.3, 468.9, 198/474.1
See application file for complete search history.

(56) References Cited

U.S. PATENT DOCUMENTS

| | | | | |
|---|---|---|---|---|
| 5,097,935 | A * | 3/1992 | Weiss | 198/345.3 |
| 6,000,901 | A * | 12/1999 | Fierkens | 414/416.09 |
| 6,246,229 | B1 * | 6/2001 | Slates | 324/207.12 |
| 7,985,065 | B2 * | 7/2011 | Lo et al. | 425/534 |
| 8,033,381 | B2 * | 10/2011 | Konstandin et al. | 198/458 |

* cited by examiner

*Primary Examiner* — Leslie A Nicholson, III
(74) *Attorney, Agent, or Firm* — Novak Druce Connolly Bove + Quigg LLP

(57) ABSTRACT

A workpiece-separating device includes a rotating assembly, a moving assembly, and a driver. The rotating assembly includes a limiting board and a rotating shaft, wherein the limiting board defines a through groove, and the rotating shaft defines a plurality of grooves. A distance between two adjacent grooves changes along a circumferential direction of the rotating shaft. The moving assembly includes a number of first moving blocks for mounting workpieces. Each first moving block is slidably mounted in the through groove and a corresponding groove. The driver drives the rotating shaft to rotate, allowing the first moving blocks to move along the grooves and the through groove to separate the workpieces.

11 Claims, 4 Drawing Sheets

WORKPIECE-SEPARATING DEVICE

BACKGROUND

1. Technical Field

The present disclosure relates to workpiece-separating devices, and especially to a workpiece-separating device that can uniformly separate workpieces.

2. Description of Related Art

Workpiece-separating devices are used to provide workpieces to a subsequent process. Sometimes, it is necessary to uniformly separate the workpieces for the subsequent process or assembly of the workpieces. However, the current workpiece-separating devices cannot achieve this purpose.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
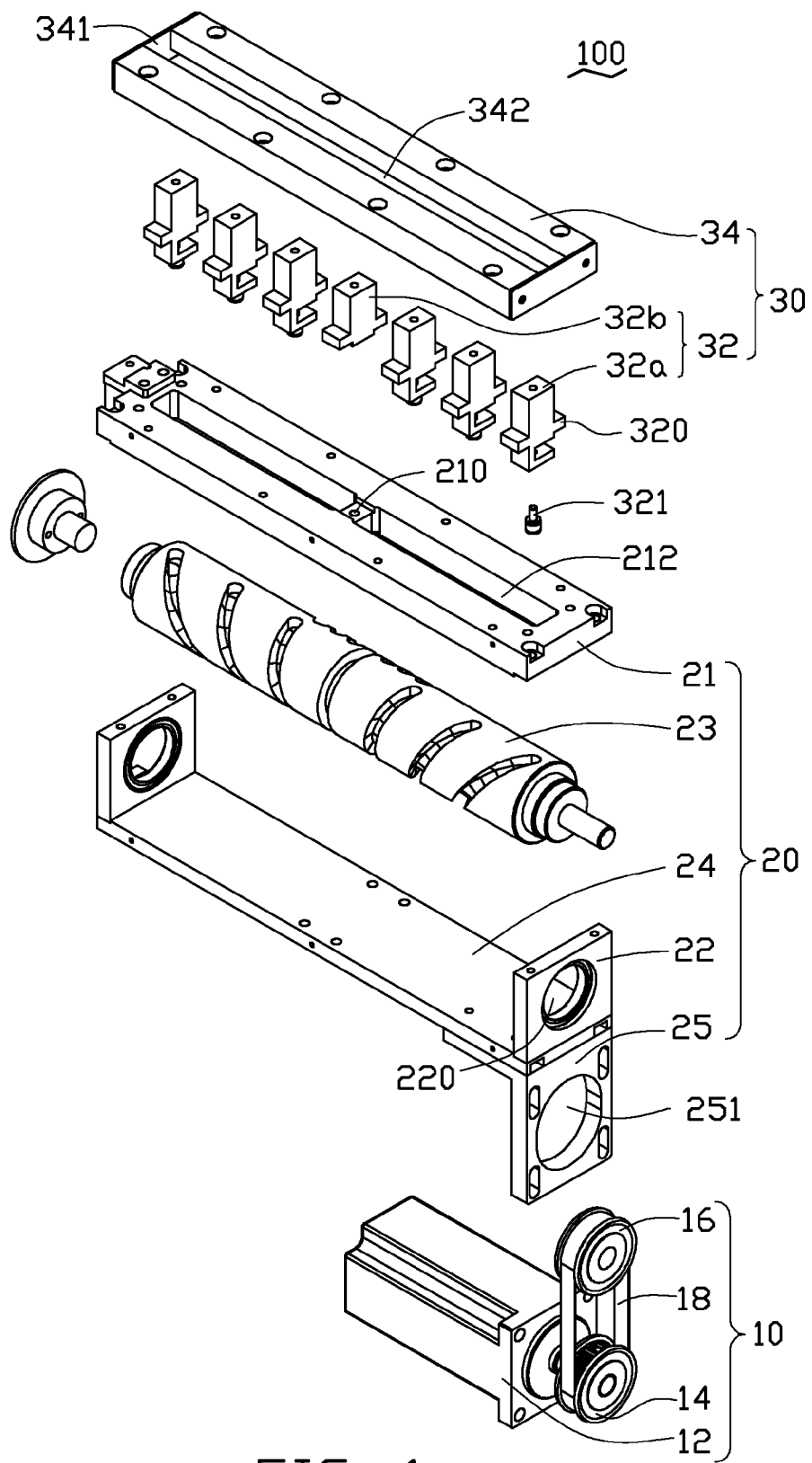
FIG. 1 is an exploded view of a workpiece-separating device in accordance with an exemplary embodiment.
Figure 2:
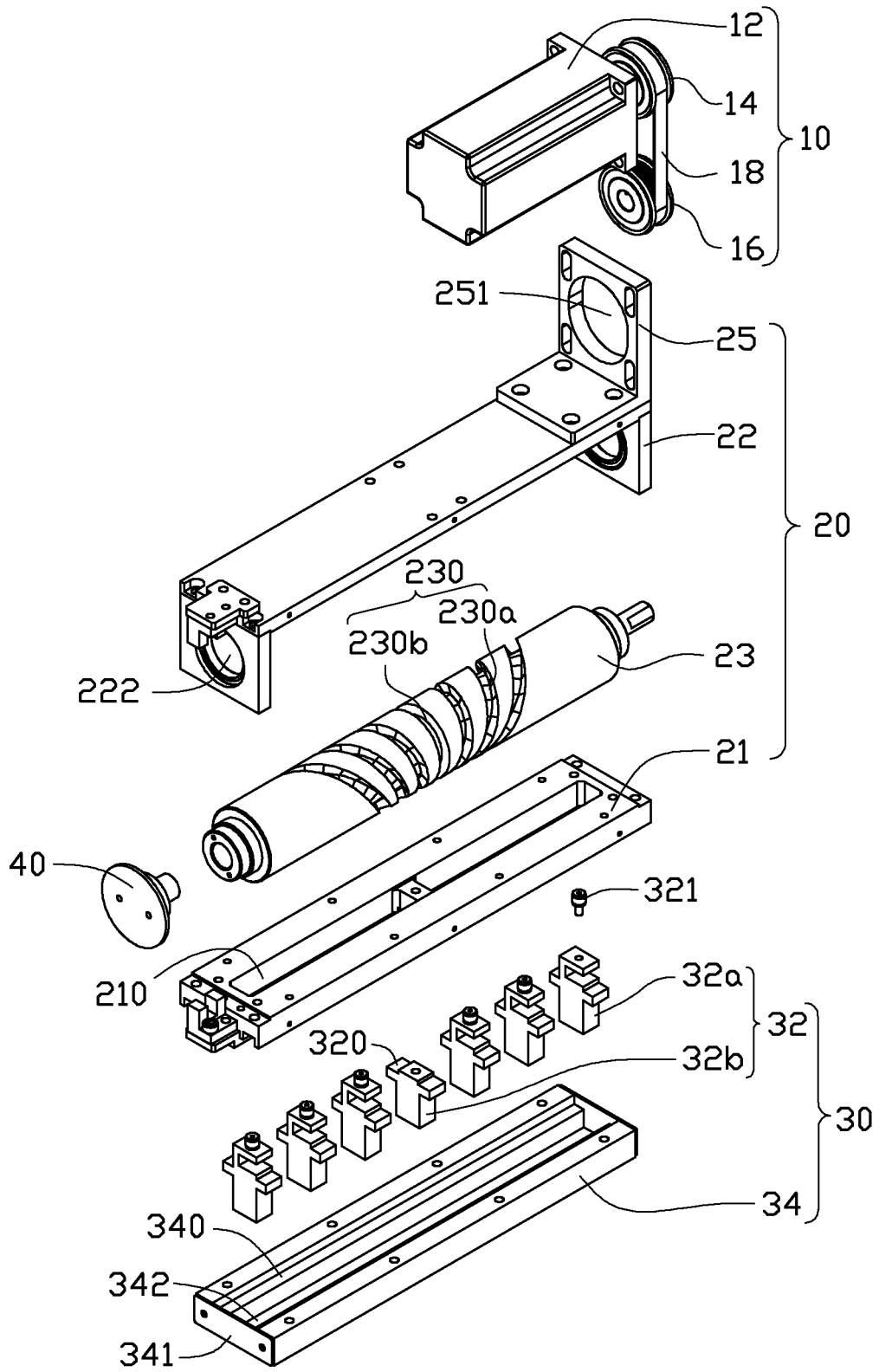
FIG. 2 is similar to FIG. 1, but viewed from another aspect.

Referring to FIGS. 1 and 2, a workpiece-separating device 100 according to an exemplary embodiment includes a driver 10, a rotating assembly 20, and a moving assembly 30.

The driver 10 includes a motor 12, a driving gear 14, a driven gear 16, and a transmission belt 18. The transmission belt 18 surrounds the driving gear 14 and the driven gear 16. The motor 12 drives the driving gear 14 to rotate, thereby rotating the driven gear 16.

The rotating assembly 20 includes a limiting board 21, two supporting plates 22, a rotating shaft 23, a mounting plate 24, and a fastening block 25.

The limiting board 21 has a fixing portion 210 in a central portion of the limiting board 21, and defines two through grooves 212 at two sides of the fixing portion 210. The two supporting plates 22 are fastened to two ends of the limiting board 21, respectively. Each supporting plate 22 defines a mounting hole 220 in a central portion thereof. Two ends of the rotating shaft 23 are rotatably mounted in the two mounting holes 220, allowing the rotating shaft 23 to be rotatably mounted to the supporting plates 22. One end of the rotating shaft 23 is mounted in the driven gear 16, such that the driven gear 16 drives the rotating shaft 23 to rotate. The rotating shaft 23 defines a plurality of grooves 230. A distance between two adjacent grooves 230 changes along a circumferential direction of the rotating shaft 23, such that a distance between any two adjacent grooves 230 gradually increases or decreases as the rotating shaft 23 rotates. The grooves 230 include a plurality of first grooves 230a, and a second groove 230b. The second groove 230b is defined in a center of the rotating shaft 23. In the exemplary embodiment, there are six first grooves 230a, which are symmetrically arranged at opposite sides of the second groove 230b. Each first groove 230a is substantially helical. The second groove 230b is circular. The mounting plate 24 is fixed to one side of the two supporting plates 22. The fastening block 25 is fastened to the mounting plate 24, and the motor 12 is held by the fastening block 25, such that the driving gear 14 protrudes out of a receiving hole 251 of the fastening block 25.

The moving assembly 30 includes a plurality of moving blocks 32 and two sliding sheets 34. The moving blocks 32 include a plurality of first moving blocks 32a, and a second moving block 32b. In the exemplary embodiment, there are six first moving blocks 32a, corresponding to the six first grooves 230a. Each first moving block 32a includes a sliding wheel 321 mounted on one end of the moving block 32a. Each sliding wheel 321 is slidably assembled in a first groove 230a, allowing the first moving blocks 32a to move/slide along the first grooves 230a. The second moving block 32b is fastened on the fixing portion 210 of the limiting board 21. The ends of the first moving blocks 32a opposite to the sliding wheel 321, and the end of the second moving block 32b opposite to the fixing portion 210, are all mounted with mechanical arms or suction cups (not shown) to pick and/or place workpieces (not shown). Each moving block 32 has two protruding portions 320 at two opposite sides of the moving block 32.

Each sliding sheet 34 defines a resisting notch 340. The two sliding sheets 34 are connected by two connecting sheets 341, which are fixed to two ends of the two sliding sheets 34, respectively. The two resisting notches 340 are coplanar with each other. A limiting groove 342 is defined between the two sliding sheets 34. The two resisting notches 340 cooperate to resist the protruding portions 320 of the moving blocks 32, such that the moving blocks 32 are slidably limited in the limiting groove 342. It is to be understood that, the two sliding sheets 34 can also be replaced by an integrated sheet, whereby the integrated sheet is partially cut to form the limiting groove 342.

In one exemplary embodiment, the workpiece-separating device 100 further includes an inductor 40 mounted to the end of the rotating shaft 23 away from the driver 10. The inductor 40 tests the rotational rate of the rotating shaft 23 to guarantee that the workpiece-separating device 100 works precisely.

Figure 3:
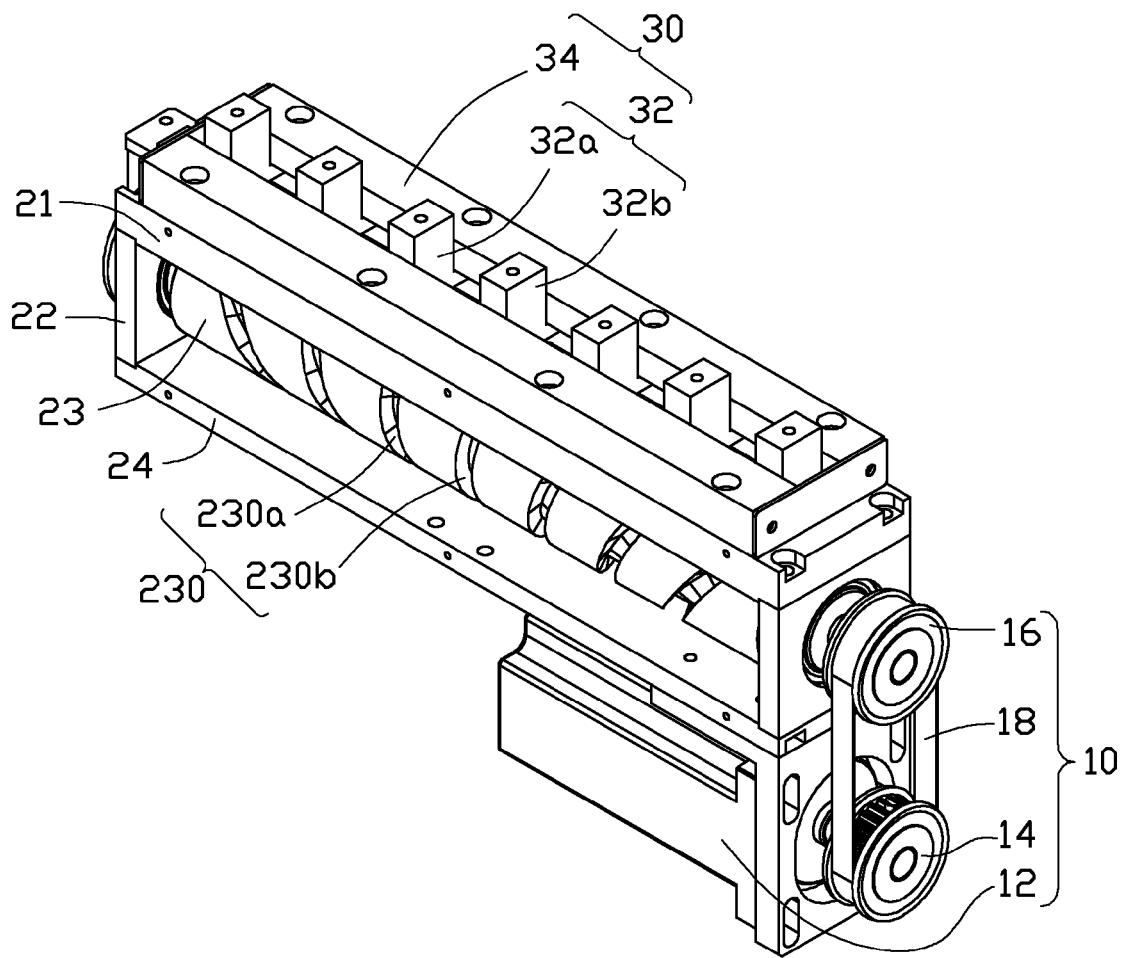
FIG. 3 is an assembled view of a first state of the workpiece-separating device of FIG. 1.
Figure 4:
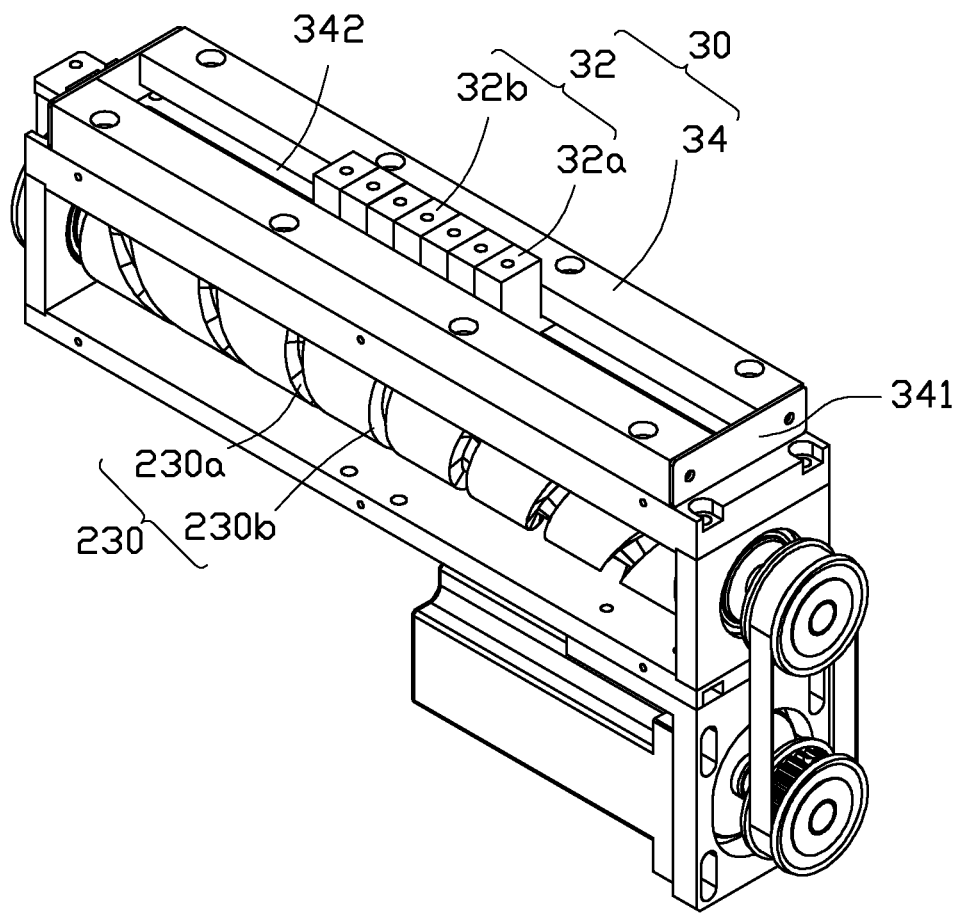
FIG. 4 is an assembled view of a second state of the workpiece-separating device of FIG. 1.

Referring to FIGS. 3 and 4, when using the workpiece-separating device 100, the motor 12 first drives the driving gear 14 to rotate, allowing the transmission belt 18 to drive the driven gear 16 to rotate. The driven gear 16 further drives the rotating shaft 23 to rotate. Since the sliding wheels 321 of the first moving blocks 32a are slidably mounted in the first grooves 230a, the first moving blocks 32a move along the first grooves 230a. Since the distance between two adjacent grooves 230 changes along the circumferential direction of the rotating shaft 23, when the rotating shaft 23 rotates, the first moving blocks 32 are moved steadily apart from each other along the limiting groove 342. Therefore, the workpieces attached to the moving blocks 32 are uniformly separated from each other.

The exemplary workpiece-separating device 100 uniformly separates the workpieces by simply controlling the motor 12 of the driver 10. Therefore, the workpieces are uniformly separated from each other quickly and precisely.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A workpiece-separating device, comprising:
   a rotating assembly comprising a limiting board and a rotating shaft, the limiting board defining a through groove, the rotating shaft defining a plurality of grooves, the distance between each two adjacent grooves changing along the circumferential direction of the rotating shaft;
   a moving assembly comprising a plurality of first moving blocks for mounting workpieces, each first moving block being slidably mounted in the through groove and a corresponding groove; and
   a driver for driving the rotating shaft to rotate, allowing the first moving blocks to move along the groove and in the through groove, to separate the workpieces;
   wherein the grooves comprise a plurality of first grooves of quantity equal to a quantity of the plurality first moving blocks, and a second groove, the second groove is defined in the center of the rotating shaft, the first grooves are symmetrically arranged at two sides of the second groove.

2. The workpiece-separating device as claimed in claim 1, wherein each first moving block comprises a sliding wheel mounted on one end of the first moving block, each sliding wheel corresponds to and is slidably assembled in a first groove, allowing the first moving block to move along the first groove, the ends of the first moving blocks opposite to the sliding wheel are mounted workpieces.

3. The workpiece-separating device as claimed in claim 1, wherein the limiting board defines a fixing portion in the center of the limiting board, the moving assembly further comprises a second moving block, the second moving block is fixed to the fixing portion, the end of the second moving block opposite to the fixing portion is mounted workpiece.

4. The workpiece-separating device as claimed in claim 3, wherein the limiting board defines two through grooves, the two through grooves are arranged at two sides of the fixing portion, the first moving blocks are slidably mounted in the through grooves.

5. The workpiece-separating device as claimed in claim 3, wherein the moving assembly further comprises two sliding sheets, each sliding sheet defines a resisting notch, the two resisting notches are coplanar with each other and form a limiting groove between the two sliding sheets, each first moving block defines two protruding portions at two opposite sides of the first moving block, the second moving block also defines two protruding portions at two opposite sides of the second moving block, the protruding portions are slidably resisted the resisting notches, allowing the first and second moving blocks to be slidably limited in the limiting groove.

6. The workpiece-separating device as claimed in claim 1, wherein the rotating assembly further comprises two supporting plates, the two supporting plates are fastened to two ends of the limiting board.

7. The workpiece-separating device as claimed in claim 6, wherein each supporting plate defines a mounting hole in the center of the supporting plate, the two ends of the rotating shaft are rotatably mounted in the two mounting holes, allowing the rotating shaft to be rotatably mounted to the supporting plates.

8. The workpiece-separating device as claimed in claim 6, wherein the rotating assembly further comprises a mounting plate and a fastening block, the mounting plate is fixed to the two supporting plates, the fastening block is fastened to the mounting plate and opposite to the limiting board, the driver is mounted to the fastening block.

9. The workpiece-separating device as claimed in claim 1, wherein the driver comprises a motor, a driving gear, a driven gear, and a transmission belt, the transmission belt surrounds the driving gear and the driven gear, the rotating shaft is mounted in the driven gear, the motor drives the driving gear to rotate, allowing the transmission belt to drive the driven gear and the rotating shaft to rotate.

10. The workpiece-separating device as claimed in claim 1, wherein the workpiece-separating device further comprises an inductor mounted to the end of the rotating shaft to test the rotational rate of the rotating shaft.

11. A workpiece-separating device, comprising:
    a rotating assembly comprising a limiting board and a rotating shaft, the limiting board defining a through groove, the rotating shaft defining a plurality of grooves;
    a moving assembly comprising a plurality of first moving blocks for mounting workpieces, each first moving block being slidably mounted in the through groove and a corresponding groove; and
    a driver for driving the rotating shaft to rotate, allowing the first moving blocks to move along the groove and in the through groove, to separate the workpieces;
    wherein the grooves comprise a plurality of first grooves of quantity equal to a quantity of the plurality of first moving blocks, and a second groove, the second groove is defined in the center of the rotating shaft, the first grooves are symmetrically arranged at two sides of the second groove.

* * * * *